US012576694B1

(12) United States Patent
Mayer et al.

(10) Patent No.: US 12,576,694 B1
(45) Date of Patent: Mar. 17, 2026

(54) METHOD FOR MONITORING A REFRIGERANT FILL-QUANTITY IN A REFRIGERATION MACHINE, REFRIGERATION MACHINE, AND MOTOR VEHICLE

(71) Applicant: AUDI AG, Ingolstadt (DE)

(72) Inventors: Thomas Mayer, Ingolstadt (DE); Mohamed Ayeb, Kassel (DE)

(73) Assignee: AUDI AG, Ingolstadt (DE)

( * ) Notice: Subject to any disclaimer, the term of this patent is extended or adjusted under 35 U.S.C. 154(b) by 211 days.

(21) Appl. No.: 18/262,603

(22) PCT Filed: Feb. 7, 2022

(86) PCT No.: PCT/EP2022/052820
§ 371 (c)(1),
(2) Date: Jul. 24, 2023

(87) PCT Pub. No.: WO2022/207166
PCT Pub. Date: Oct. 6, 2022

(30) Foreign Application Priority Data

Mar. 31, 2021 (DE) ......................... 102021108124.6

(51) Int. Cl.
*B60H 1/32* (2006.01)
(52) U.S. Cl.
CPC ... *B60H 1/3205* (2013.01); *B60H 2001/3257* (2013.01)
(58) Field of Classification Search
CPC ..................... B60H 1/3205; B60H 2001/3257
See application file for complete search history.

(56) References Cited

U.S. PATENT DOCUMENTS 4,745,765 A 5/1988 Pettitt
5,560,213 A * 10/1996 Wieszt ................. B60H 1/3225
62/125
(Continued)

FOREIGN PATENT DOCUMENTS

CN 102378884 A * 3/2012 ............... F25B 45/00
CN 108983605 A * 12/2018 ........... G05B 13/042
(Continued)

OTHER PUBLICATIONS

Examination Report issued on Jul. 30, 2025, in corresponding European Application No. 22703934.4, 12 pages.
(Continued)

*Primary Examiner* — Emmanuel E Duke
(74) *Attorney, Agent, or Firm* — Maier & Maier, PLLC

(57) ABSTRACT

A method for monitoring a refrigerant fill-quantity of a refrigeration machine, which includes a compressor for compressing the refrigerant, an expansion device for relieving the pressure of the refrigerant, a high-pressure heat exchanger through which the refrigerant is passed after compression by the compressor to transfer heat to a heat exchange medium, and a low-pressure heat exchanger through which the refrigerant is passed after pressure relief by the expansion device, to absorb heat from the heat exchange medium or a further heat exchange medium. Fill level information relating to the refrigerant fill-quantity is determined as a function of a plurality of operating parameters, the fill level information is determined independently from the temperature of the refrigerant after compression by the compressor.

17 Claims, 2 Drawing Sheets

(56)                    References Cited

U.S. PATENT DOCUMENTS

| | | | |
|---|---|---|---|
| 9,759,465 | B2 | 9/2017 | Schuster et al. |
| 2011/0144807 | A1 | 6/2011 | Buda et al. |
| 2016/0223234 | A1 | 8/2016 | Vaisman |
| 2019/0203995 | A1 | 7/2019 | Ueda et al. |
| 2020/0300522 | A1 | 9/2020 | Inao et al. |
| 2021/0157312 | A1 * | 5/2021 | Cella .................. G01M 13/045 |

FOREIGN PATENT DOCUMENTS

| | | | | |
|---|---|---|---|---|
| DE | 19854060 | A1 * | 6/2000 | ........... F25B 49/005 |
| DE | 10214519 | A1 | 10/2002 | |
| DE | 19854060 | B4 | 6/2005 | |
| DE | 102004024579 | B3 * | 1/2006 | ........... B60H 1/3225 |
| DE | 102013019498 | A1 * | 5/2015 | ........... F25B 49/005 |
| DE | 102014221106 | A1 | 4/2016 | |
| DE | 102014223956 | B4 | 10/2018 | |
| EP | 3377830 | B1 | 9/2019 | |
| EP | 3620757 | A1 * | 3/2020 | ........... G01F 23/292 |
| WO | 2005115776 | A1 | 12/2005 | |
| WO | WO-2019162327 | A2 * | 8/2019 | .............. G01C 3/12 |

OTHER PUBLICATIONS

Search Report and Written Opinion issued on May 20, 2022, in corresponding International Application No. PCT/EP2022/052820, 13 pages.
Examination Report issued on Oct. 22, 2021, in corresponding German Application No. 10 2021 108 124.6, 10 pages.

* cited by examiner

METHOD FOR MONITORING A REFRIGERANT FILL-QUANTITY IN A REFRIGERATION MACHINE, REFRIGERATION MACHINE, AND MOTOR VEHICLE

FIELD

The invention relates to a method for monitoring a refrigerant fill-quantity of a refrigeration machine, which has a compressor for compressing the refrigerant, an expansion device for pressure relief of the refrigerant, a high-pressure heat exchanger, through which the refrigerant is passed through after compression by the compressor, in order to transfer heat to a heat exchange medium, in particular air, and a low-pressure heat exchanger, through which the refrigerant is passed through after pressure relief by the expansion device, in order to absorb heat from the or another heat exchange medium, wherein fill level information relating to the refrigerant fill-quantity is determined as a function of a plurality of operating parameters. In addition, the invention relates to a refrigeration machine and a motor vehicle.

BACKGROUND

Refrigeration machines are used in motor vehicles, for example as part of air conditioning systems, in order to enable cooling of the vehicle interior. However, they are also used in a variety of other applications, from industrial applications to refrigerators. The compression and expansion of the refrigerant in the refrigerant circuit of the refrigeration machine allows heat to be transported in a targeted manner. In this case, a certain fill level of refrigerant in the refrigerant circuit must be maintained in order to achieve heat transport at all and in particular in order to achieve high heat transport efficiency.

In air conditioning systems in motor vehicles, it is typically assumed that the refrigerant losses during operation are sufficiently small that losses compared to an initial refrigerant fill-quantity do not lead to an excessive limitation in the refrigerating capacity. However, over a long period of use of a motor vehicle, the cooling capacity for a user can drop noticeably. In addition, if the refrigerant circuit is underfilled, in addition to insufficient refrigeration capacity, the compressor may also be impaired, since this may mean that it is no longer possible to supply enough oil for lubrication of the same.

In principle, it would be possible to introduce a fixed service interval for refilling refrigerant in order to avoid a noticeable reduction in cooling capacity and the resulting complaints. However, since the refrigerant fill level cannot be easily measured and both overfilling and underfilling can have disadvantages including component impairments during operation, a complete replacement of the refrigerant is typically required in this case, namely a suction of the existing refrigerant and a complete refilling of the refrigerant circuit with the prescribed quantity of refrigerant, including replacement of the oil previously extracted with the refrigerant. This can result in high service costs if the refrigerant is replaced regularly. This applies in particular because service intervals should be chosen sufficiently short as a precautionary measure in order to always carry out a refrigerant replacement in good time for all application scenarios and motor vehicle models, even with tolerances occurring within the same series, since otherwise inefficient cooling or even impairments to the compressor can occur.

DE 10 2013 019 498 A1 proposes monitoring various operating parameters of a refrigeration machine and estimating a refrigerant fill-quantity as a function of these operating parameters. The estimated refrigerant fill-quantity can be used to introduce refrigerant from a reservoir into the refrigerant circuit or remove it from it as required. In particular, with respect to said disclosure, in cases in which an additional refrigerant reservoir is to be dispensed with, but also in the device described in the publication mentioned, it would be desirable to enable a more precise forecast of a refrigerant fill-quantity or of a deviation from an initial refrigerant fill-quantity.

SUMMARY

The object of the invention is therefore to specify an improved method for monitoring a refrigerant fill-quantity which, in particular, achieves a more precise estimation of the refrigerant fill-quantity.

The object is achieved according to the invention by a method of the type mentioned at the outset, in which the fill level information is determined independently of the temperature of the refrigerant after compression by the compressor, wherein a temperature of the heat exchange medium or of the additional heat exchange medium is used as one of the operating parameters, wherein, upon fulfillment of a fill level information-dependent notification condition a notification device is controlled in order to provide a notification to a user or an external device.

The invention recognized that a refrigerant fill-quantity or a change in a refrigerant fill-quantity can be estimated much more accurately if a temperature of the refrigerant after compression by the compressor, which is used, for example, in DE 10 2013 019 498 A1, is not taken into account, since this variable can have a certain inertia and can therefore only be suitable to a limited extent to describe an actually current operating state of a refrigeration machine. It was recognized within the scope of the invention that a particularly good accuracy can be achieved if, instead of these parameters of the refrigerant circuit, the temperature of the heat exchange medium or of the additional heat exchange medium is taken into account. As will be explained later, the number of operating parameters taken into account does not necessarily have to be changed as a result, so that improved accuracy can be achieved despite essentially the same computing effort. In addition, temperature monitoring is possible with little technical effort, for example by using a resistive temperature sensor, so that the method according to the invention can be implemented with minimal technical effort.

The monitored refrigeration machine can in particular be the refrigeration machine of an air conditioning system of a motor vehicle or can be used to cool a component of a motor vehicle, for example motor vehicle electronics, a battery or an engine.

The operating parameters can be detected by sensors. However, it is also possible for at least one of the operating parameters to be determined on the basis of control information which is already available, for example, in a control device of the refrigeration machine or motor vehicle and is used, for example, to control the compressor. For example, temperatures and pressures can be detected by sensors and a speed and/or an output of the compressor can be determined on the basis of control information. Alternatively, however, these variables relating to the compressor can also be detected by sensors.

The fill level information can directly describe the refrigerant fill-quantity of the refrigerant circuit and, for example, indicate a weight of the refrigerant in the refrigerant circuit. In particular, if, as will be explained later, an algorithm for determining the fill level information is trained on the basis of training data, it can be advantageous to at least largely compensate for the influence of tolerances with regard to an initial fill level or tolerance-related deviations between individual vehicles in that fill level information is determined instead, which describes a deviation from an initial fill quantity. In particular, the notification condition can be fulfilled or can only be fulfilled if fill level information describing a fill quantity falls below a limit value or fill level information describing a deviation from an initial fill quantity exceeds a limit value.

The notification can be, for example, an optical or acoustic notification that indicates a need for maintenance. In addition or as an alternative, a notification can be transmitted to a workshop, the vehicle manufacturer or the like, for example by radio transmission. The notification can in particular comprise the fill level information or information dependent on the fill level information. In particular, this can make it possible to inform the user or the external device about the amount of refrigerant to be refilled. In addition or as an alternative, it may be possible to read out the fill level information from the control device or an error memory, to display it on a display device or the like, independently of the fulfillment of the notification condition or at any time after the fulfillment of the notification condition.

The refrigerant used in refrigeration machines is one that performs a phase transition. Since such a refrigerant typically condenses in the high-pressure heat exchanger, this can also be referred to as a condenser. Correspondingly, the low-pressure heat exchanger can be referred to as an evaporator.

The temperature of the heat exchange medium before it is heated by the high-pressure heat exchanger can be used as the operating parameter. In particular, this can be the only operating parameter used that relates to a temperature of the heat exchange medium or the additional heat exchange medium. This temperature can be detected, for example, via a temperature sensor on a supply line of the high-pressure heat exchanger for the heat exchange medium. As part of the development of the method according to the invention, it was recognized that it is particularly advantageous to take this temperature into account instead of the temperature of the refrigerant after compression by the compressor.

According to the invention, the fill level information is determined as a function of a plurality of operating parameters. In addition to the temperature of the heat exchange medium or of the additional heat exchange medium, in particular in addition to the temperature of the heat exchange medium before it is heated by the high-pressure heat exchanger, a pressure of the refrigerant before compression by the compressor and/or a pressure of the refrigerant after compression by the compressor and/or a temperature of the refrigerant before compression by the compressor and/or a speed of the compressor and/or the electrical power supplied to the compressor are used as operating parameters for determining the fill level information. At least some of these parameters are preferably taken into account in order to achieve the most accurate possible determination of the fill level information. In particular, all the variables mentioned can be used. As part of the development of the method according to the invention, it was recognized that in this case a particularly precise estimate of the refrigerant fill-quantity or of its change is made possible. However, it is not necessary for all of these operating parameters to be evaluated. For example, as part of the development of the method according to the invention, it was also recognized that good accuracy can be achieved even without taking into account the power supplied to the compressor.

Particularly preferably, only the variables mentioned can be taken into account as operating parameters. According to the invention, the temperature of the refrigerant after the compressor, which is evaluated according to previously mentioned document DE 10 2013 019 498, is not taken into account. In this way, possible deviations due to the inertia of this variable can be avoided.

The fill level information can be determined by an algorithm that is parameterized by a machine learning method. In particular, a neural network can be used as the algorithm or as part of the algorithm. During the development of the method according to the invention, a good prognosis quality was achieved when a neural network with six artificial neurons was trained. However, larger or smaller numbers of artificial neurons can also deliver good results, for example neural networks with three to twenty artificial neurons, in particular neural networks with five to ten artificial neurons.

In this case, the training data can be generated in such a way that the neural network or the algorithm is trained on actually detected states. This can be achieved, for example, by the training data sets each describing operating parameters for a current operating state or point in time. Correspondingly, the actual currently present refrigerant fill-quantity can also be detected at the respective point in time and used as part of the training data set during a monitored training session.

Instead of neural networks, other algorithms can alternatively be parameterized using machine learning methods. For example, machine learning can be used to parameterize a given function by regression analysis.

The algorithm can be or include a neural network, in particular a feedforward network or a feedback neural network, wherein an intermediate variable determined from input variables of this artificial neuron is mapped in at least one artificial neuron of the neural network by an activation function in order to provide data from this artificial neuron, wherein the activation function is calculated directly or approximated by using a lookup table. Activation functions of artificial neurons in neural networks are typically non-linear functions. For example, a tanh function can be used as an activation function. The calculation of such non-linear functions is non-trivial, so that, for example, the computing power available in an air conditioning control device of a motor vehicle may not be sufficient to calculate such an activation function in real time. Instead of an exact calculation of the activation function, it is thus possible to use an approximation of the activation function by means of a lookup table, which assigns specific output data to specific intermediate variables. Preferably, the output variables are not read out directly; rather, the intermediate variable is interpolated, in particular linearly, on the basis of the variables from the lookup table. In this way, a good compromise can be achieved between minimizing the required computing effort and the accuracy achieved.

The fill level information can be determined repeatedly, in particular during ongoing driving operation, wherein the fulfillment of the notification condition depends on a plurality of fill level information determined one after the other. In a simple example, it can be checked whether, for example, a certain number of consecutive fill level information exceeds or falls below a limit value and only in this case can the notification condition be fulfilled.

Particularly preferably, however, the fill level information is determined repeatedly, wherein the fulfillment of the notification condition depends on a mean value or a weighted mean value of a predetermined number of fill level information items last determined. This can be advantageous if the algorithm for determining the fill level information assumes that the refrigeration machine is in a transient state. However, this can mean that jumps in the operating parameters can lead to jumps in the fill level information that do not correlate with the actual fill level. This can be largely avoided by the explained, in particular weighted, averaging, since this smooths the temporal profile of the fill level information. Alternatively, this could be achieved, for example, by filtering the time profile of the fill level information before using a suitable smoothing method, for example gradient-dependent filtering based on the operating parameters and/or the currently calculated fill-quantity forecast.

In addition to the method according to the invention, the invention relates to a refrigeration machine, comprising a compressor for compressing the refrigerant, an expansion device for pressure relief of the refrigerant, a high-pressure heat exchanger, through which the refrigerant is guided during operation of the refrigeration machine after compression by the compressor in order to transfer heat to a heat exchange medium, in particular air, and a low-pressure heat exchanger, through which, during operation of the refrigeration machine, the refrigerant is guided through after the pressure has been relieved by the expansion device, in order to absorb heat from the heat exchange medium or another heat exchange medium, wherein the refrigeration machine comprises a control device that is arranged to carry out the method according to the invention.

The features and corresponding advantages disclosed for the method according to the invention can be transferred to the refrigeration machine according to the invention and vice versa.

The invention also relates to a method for monitoring a refrigerant fill-quantity of a refrigeration machine, which comprises a compressor for compressing the refrigerant, an expansion device for pressure relief of the refrigerant, a high-pressure heat exchanger, through which the refrigerant is passed through after compression by the compressor, in order to transfer heat to a heat exchange medium, in particular air, and a low-pressure heat exchanger, through which the refrigerant is passed through after pressure relief by the expansion device, in order to absorb heat from the heat exchange medium or another heat exchange medium, wherein the motor vehicle comprises a control device arranged to carry out the method according to the invention.

The control device can be integrated into the refrigeration machine. In this case, the motor vehicle according to the invention comprises a refrigeration machine according to the invention. The refrigeration machine can in particular be part of an air conditioning device for air conditioning the interior of the motor vehicle. Irrespective of whether the control device is integrated into the refrigeration machine, it can be part of the air conditioning system and can be implemented, for example, by a thermal management control unit.

The features and corresponding advantages disclosed for the method and the refrigeration machine according to the invention can be transferred to the motor vehicle according to the invention and vice versa.

BRIEF DESCRIPTION OF THE FIGURES

Further advantages and details of the invention follow from the following exemplary embodiments and from the drawings. Schematically.

DETAILED DESCRIPTION

Figure 1:
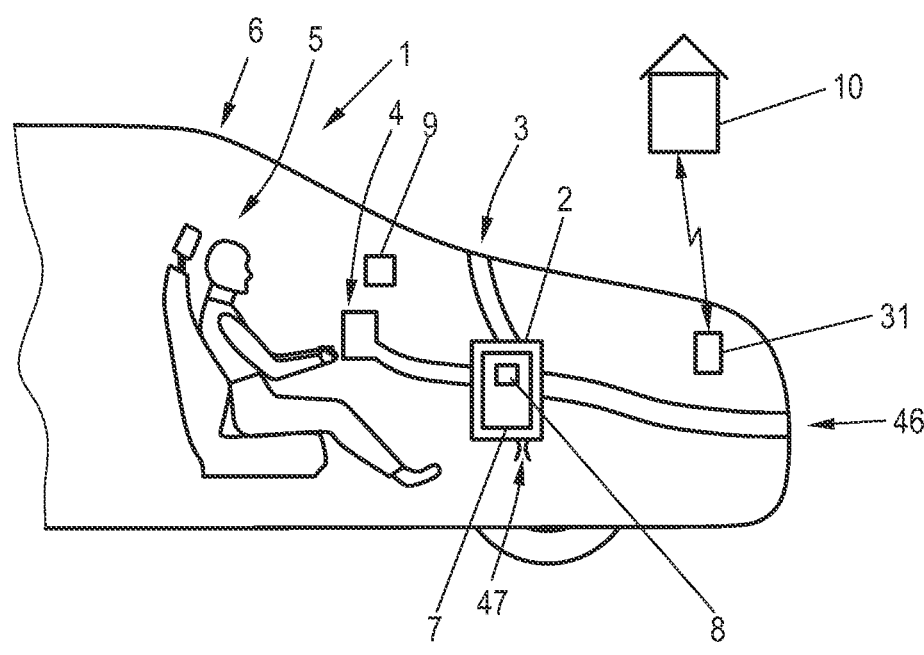
FIG. 1 shows an exemplary embodiment of a motor vehicle according to the invention.

FIG. 1 shows a motor vehicle 1 which has an air conditioning system 2 in order to air-condition the interior 5 of the motor vehicle 1. For this purpose, air is drawn in via an intake opening 3 and introduced into the interior 5 via vents 4. The supplied air can be cooled by a refrigeration machine 7.

Figure 3:
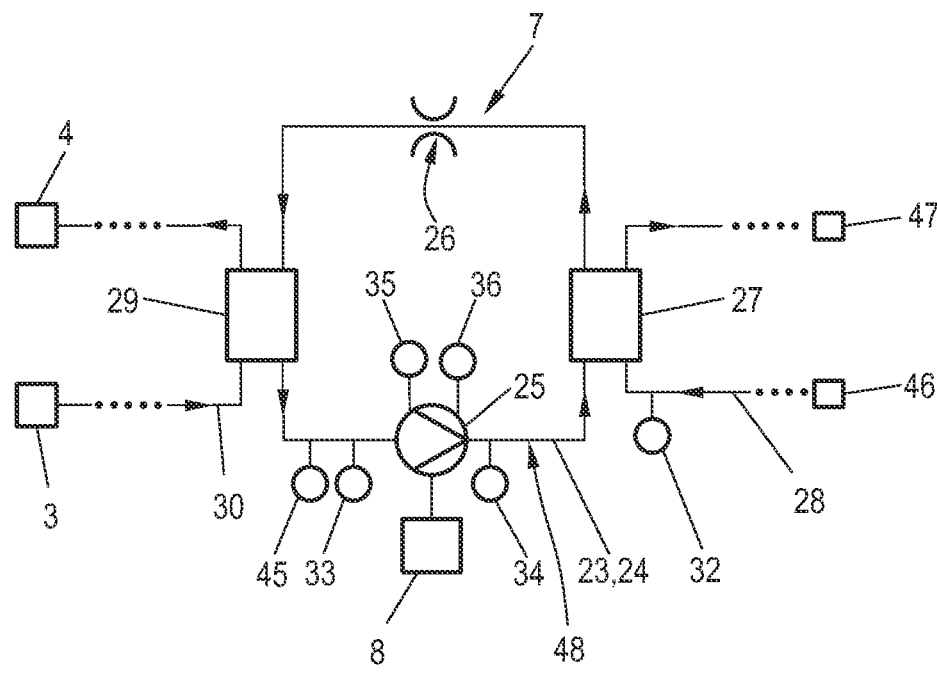
FIG. 3 shows an exemplary embodiment of a refrigeration machine according to the invention.

The structure of the refrigeration machine 7 is shown schematically in FIG. 3. In a refrigerant circuit 23, the refrigerant 24 is compressed by the compressor 25, causing its density and temperature to rise. Then it is passed through the high-pressure heat exchanger 27 to transfer heat to a heat exchange medium 28. The thus cooled refrigerant 24 is then passed through an expansion device 26, for example a restrictor or an enlargement of the channel cross section, as a result of which the pressure drops and the temperature of the refrigerant is also further reduced. In the low-pressure heat exchanger 29, heat is then absorbed by the refrigerant 24 from a heat exchange medium 30 and the heat exchange medium 30 is thus cooled. The thus heated refrigerant 24 is in turn fed to the compressor 25 in order to run again through the described circuit.

In the motor vehicle shown in FIG. 1, the heat exchange medium 30 is air, which is supplied via the intake opening 3 and discharged into the interior 5 via the vent 4 after cooling. The heat exchange medium 28 is typically also air, which can be drawn in, for example, via the intake opening 46 in the region of the front of the vehicle and discharged, through a further opening 47, after it has been heated in the high-pressure heat exchanger 27, for example on the underside of the refrigeration machine 7, into the engine compartment.

As already explained in the general part of the description, sufficiently large refrigerant losses can occur over the lifetime of the motor vehicle 1 that the cooling capacity of the refrigeration machine 7 can drop noticeably. It can therefore be necessary or at least advantageous to restore the optimal refrigerant fill level. However, in order to avoid unnecessarily high costs, this should only be done when it is actually necessary. In addition, it should advantageously only be possible to refill the amount of refrigerant that is actually required avoiding a complete evacuation and filling cycle, as is currently required.

However, since it is technically not economically possible to measure the quantity of refrigerant 24 actually present in the refrigerant circuit 23, a control device 8 of the motor vehicle 1, which can in particular be part of the air conditioning system 2 or its regulation system, determines instead, based on a plurality of operating parameters, the fill level information that relates to the refrigerant fill-quantity. The fill level information can describe the absolute refrigerant fill-quantity, but it can be advantageous instead to determine fill level information that describes a deviation of the refrigerant fill-quantity from an initial filling, corresponding to losses that have occurred during operation.

If a notification condition is met, namely in particular if it is determined that there is a lack of refrigerant or an overfill of refrigerant, a notification device 9 can be controlled in order to provide the user 6 with a notification. The notification device 9 can be, for example, a display or a warning light which provides the user 6 with a visual notification, or a loudspeaker that outputs an acoustic notification. In addition or as an alternative, a message can be sent to the external device 10 via the notification device 31. The notification device 31 can, for example, be a communication device for mobile radio communication, via which, for example, a workshop or a system of the manufacturer can be informed about the required refilling of refrigerant or the reduced quantity of refrigerant. A corresponding notification can also comprise the fill level information or information determined therefrom, which relates to a deviation in the amount of refrigerant from a target level.

The method implemented by the control device 8 for monitoring the refrigerant fill-quantity is explained in more detail below with reference to FIG. 2. A plurality of operating parameters 11 of the refrigeration machine are detected and the fill level information 20 is determined by an algorithm 18 as a function of these operating parameters 11. As already explained in the general part of the description, the algorithm 18 can be optimized or trained for a substantially stationary state of the refrigeration machine, so that non-stationary states or jumps in the operating parameters 11 can lead to significant jumps in the fill level information 20, which do not correlate with actual refrigerant level variations. In order to attenuate this behavior, an in particular weighted mean value 21 of the last detected fill level information 20 can be determined after a repeated determination of the fill level information 20 and the notification condition 22 can evaluate this mean value 21.

It was recognized that taking into account the temperature of the refrigerant after compression by the compressor, namely the temperature in portion 48 of the refrigerant circuit 23, can surprisingly reduce the accuracy of the determination of the refrigerant fill-quantity. Due to the inertia of this variable that occurs in the exemplary embodiment, taking this variable into account would falsify the result. Instead, the temperature 12 of the heat exchange medium 28 before it is heated by the high-pressure heat exchanger 27 is additionally used to estimate the refrigerant fill-quantity. This temperature can be detected in particular via a temperature sensor 32 in the region of the air supply to the high-pressure heat exchanger 27

Figure 2:
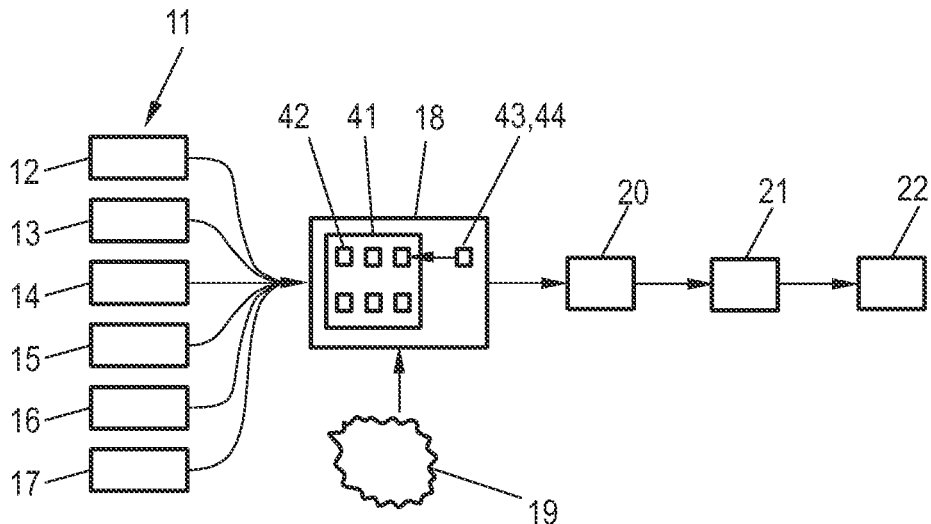
FIG. 2 shows an exemplary embodiment of the method according to the invention.

In FIG. 2 a total of six operating parameters 11 are thus taken into account, wherein the combination shown of operating parameters 11 to be evaluated has turned out to be particularly expedient. These operating parameters 11 are the temperature 12 of the heat exchange medium 28 before it is heated by the high-pressure heat exchanger 27, which can be detected by the temperature sensor 32, namely in particular the temperature of the inflowing air or the ambient temperature, the pressure 13 of the refrigerant 24 before compression by the compressor 25, which can be detected by the pressure sensor 33, the pressure 14 of the refrigerant 24 after compression by the compressor 25, which can be detected by the pressure sensor 34, a temperature 15 of the refrigerant 24 before compression by the compressor 25, which can be detected by the temperature sensor 45, a speed 16 of the compressor 25 and an electrical power 17 supplied to the compressor 25.

The speed of the compressor 25 can in any case be known in the control device 8 since it can be relevant for the engine control of the compressor 25. Alternatively, it can be detected via a speed sensor 35 integrated in the compressor 25. The power 17 supplied to the compressor 25 can be determined, for example, with the aid of a current sensor 36 when the operating voltage is known. However, it is also possible that the voltage is additionally measured in order to detect the power completely by sensors, or that the power supplied is determined in the control device 8 on the basis of known control parameters.

In the example shown, the algorithm 18 is an algorithm that is parameterized by a machine learning method. Supervised learning is used in this case in order to train a neural network 41 using training data 19. Optional feedback neural networks can be used in this case. A possible training data set can describe a set of operating parameters 11 and the refrigerant fill-quantities actually present in a motor vehicle when this set of operating parameters 11 is present, or a deviation of these refrigerant fill-quantities from a predetermined initial filling.

Methods for training neural networks using training data are well known and will therefore not be described in detail. For example, error feedback can be used, in which the parameters of the neural network 41 are determined as a function of deviations of the determined fill level information 20, which was determined by the neural network 41 on the basis of operating parameters contained in the training data set, from the fill level information actually contained in the training data set, wherein a predetermined combination of a plurality of artificial neurons 42 is used for the determination.

The neural network 41 includes a plurality of artificial neurons 42, in the example six artificial neurons 42. An artificial neuron 42 is typically implemented in such a way that a weighted addition of a plurality of input variables takes place in order to determine an intermediate variable, to which a non-linear activation function is then applied in order to provide output data. All operating parameters 11 or parts of the operating parameters 11 and/or output data from other artificial neurons 42 can serve as input data for an individual artificial neuron. Weighting factors for the various input data of the respective artificial neuron can be learned as parameters within the context of machine learning. In particular, the fill level information 20 can be determined as the output data of the artificial neurons 24. However, it is also possible for a predetermined combination of output data from a plurality of the artificial neurons 42 to be used to determine the fill level information.

An evaluation of a non-linear activation function can be computationally relatively intensive. In order nevertheless to enable the method shown in FIG. 2 and in particular the neural network 41 to be implemented by a control device 8 of a conventional air conditioning system in a motor vehicle, the activation function 43 of the individual artificial neurons 42 is approximated by a lookup table 44 in which associated pairs of intermediate variables and initial data are stored. In the simplest case, those output data can be respectively selected that are assigned via the lookup table to the intermediate variable that comes closest to the actually determined intermediate variable. However, a linear interpolation between the values stored in the lookup table 44 preferably takes place. This provides a good compromise between a low computing power requirement and good computing accuracy.

Figure 4:
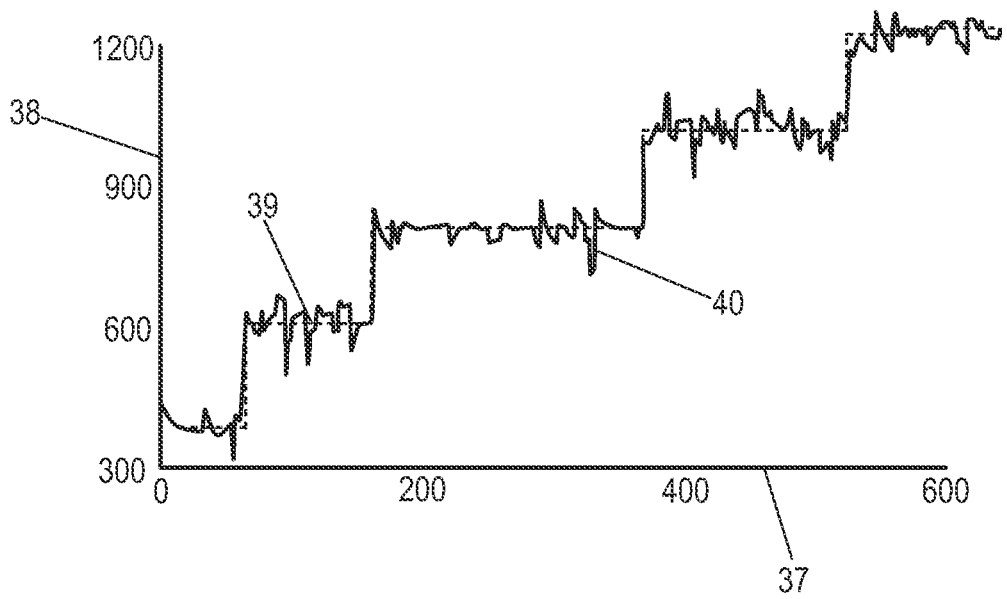
FIG. 4 shows a comparison of refrigerant fill-quantities determined by the method according to the invention with measured refrigerant fill-quantities.

FIG. 4 shows an example of a validation of the results of an algorithm 18 trained as explained above with six artificial neurons 42, wherein validation data sets are used which describe the respectively detected operating parameters 11 and the refrigerant fill-quantity in grams as fill level information. The consecutive number of the respective validation data set is provided on the X-axis 37 and the fill level information on the Y-axis 38. The dashed line 39 shows the fill level information stored in the respective validation data set, while the solid line 40 shows the fill level information calculated by the algorithm 18 on the basis of the operating parameters 11 of the respective validation data set.

As can be seen clearly in FIG. 4, the actual refrigerant fill-quantity or fill level information is very well approximated by the fill level information determined by the algorithm 18, at least on average over time. The noticeable deviations of line 40 from line 39, which can also be seen in FIG. 4 result in particular from the fact, that an algorithm 18 trained for stationary operating states of the refrigeration machine 7 is applied onto operating parameters 11, which were not determined in stationary states. As already explained above, the resulting deflections of the fill level information 20 and thus of line 40 can be at least largely eliminated by a particularly weighted averaging of several last determined fill level information items 20, so that in actual operation a significantly better accuracy is achieved than for the non-averaged fill level information shown in FIG. 4.

The invention claimed is:

1. A method for monitoring a refrigerant fill-quantity of a refrigeration machine, which has a compressor for compression of the refrigerant, an expansion device for pressure relief of the refrigerant, a high-pressure heat exchanger, through which the refrigerant is passed through after compression by the compressor, in order to transfer heat to a heat exchange medium comprising air, and a low-pressure heat exchanger, through which the refrigerant is passed through after pressure relief by the expansion device, in order to absorb heat from the heat exchange medium or another heat exchange medium, wherein fill level information relating to the refrigerant fill-quantity is determined as a function of multiple operating parameters, wherein the method comprises determining the fill level information independently of the temperature of the refrigerant after compression by the compressor such that the temperature of the refrigerant after compression by the compressor is not used for calculation of the fill level information, wherein a temperature of the heat exchange medium or of the other heat exchange medium is used as one of the operating parameters, wherein, when a notification condition dependent on the fill level information is met, the method further comprises controlling a notification device in order to provide a notification to a user or an external device; and wherein the fill level information is determined by an algorithm that is parameterized by a machine learning method.

2. The method of claim 1, wherein the temperature of the heat exchange medium, before it is heated by the high-pressure heat exchanger, is used as the operating parameter.

3. The method of claim 2, wherein the fill level information is determined by an algorithm that is parameterized by a machine learning method.

4. The method of claim 2, wherein the fill level information is determined repeatedly, wherein the fulfillment of the notification condition depends on multiple successively determined fill level information items.

5. The method of claim 2, wherein the fill level information is determined repeatedly, wherein the fulfillment of the notification condition depends on a mean value or a weighted mean value of a predetermined number of fill level information items last determined.

6. The method of claim 1, wherein in addition to the temperature of the heat exchange medium or of the additional heat exchange medium, a pressure of the refrigerant before compression by the compressor and/or a pressure of the refrigerant after compression by the compressor and/or a temperature of the refrigerant before compression by the compressor and/or a speed of the compressor and/or the electrical power supplied to the compressor are used as operating parameters for determining the fill level information.

7. The method of claim 6, wherein the fill level information is determined by an algorithm that is parameterized by a machine learning method.

8. The method of claim 6, wherein the fill level information is detemrined prepeatedly, wherein the fulfillment of the notification condition depends on multiple successively determined fill level information items.

9. The method of claim 6, wherein the fill level information is determined repeatedly, wherein the fulfillment of the notification condition depends on a mean value or a weighted mean value of a predetermined number of fill level information items last determined.

10. The method of claim 1, wherein the algorithm is or comprises a neural network, wherein an intermediate variable determined from input variables of an artificial neuron is mapped in this at least one artificial neuron of the neural network by an activation function in order to provide output data from this artificial neuron, wherein the activation function is calculated directly or approximated by using a lookup table.

11. The method of claim 10, wherein the fill level information is determined repeatedly, wherein the fulfillment of the notification condition depends on multiple successively determined fill level information items.

12. The method of claim 10, wherein the fill level information is determined repeatedly, wherein the fullfillment of the notification condition depends on a mean value or a weighted mean value of a predetermined number of fill level information items last determined.

13. The method of claim 1, wherein the fill level information is determined repeatedly, wherein the fulfillment of the notification condition depends on multiple successively determined fill level information items.

14. The method of claim 1, wherein the fill level information is determined repeatedly, wherein the fulfillment of the notification condition depends on a mean value or a weighted mean value of a predetermined number of fill level information items last determined.

15. A refrigeration machine, comprising a compressor for compression of the refrigerant, an expansion device for pressure relief of the refrigerant, a high-pressure heat exchanger through which the refrigerant is passed during operation of the refrigeration machine after compression by the compressor in order to transfer heat to a heat exchange medium comprising air, and a low-pressure heat exchanger through which the refrigerant is passed during operation of the refrigeration machine after the pressure relief by the expansion device in order to absorb heat from the heat exchange medium or another heat exchange medium, wherein the refrigeration machine comprises a control device which is arranged for carrying out the method according to claim 1.

16. A motor vehicle with a refrigeration machine, comprising a compressor for compression of the refrigerant, an expansion device for pressure relief of the refrigerant, a high-pressure heat exchanger through which the refrigerant is passed during operation of the refrigeration machine after compression by the compressor in order to transfer heat to a heat exchange medium comprising air, and a low-pressure heat exchanger through which the refrigerant is passed during operation of the refrigeration machine after the pressure relief by the expansion device in order to absorb heat from the heat exchange medium or another heat exchange medium, wherein the motor vehicle comprises a control device which is arranged for carrying out the method according to claim 1.

17. The method of claim 1, wherein in addition to the temperature of the heat exchange medium or of the additional heat exchange medium, a pressure of the refrigerant before compression by the compressor and/or a pressure of the refrigerant after compression by the compressor and/or a temperature of the refrigerant before compression by the compressor and/or a speed of the compressor and/or the electrical power supplied to the compressor are used as operating parameters for determining the fill level information.

* * * * *